US008276729B2

(12) United States Patent
Meyer

(10) Patent No.: US 8,276,729 B2
(45) Date of Patent: Oct. 2, 2012

(54) DRIVE APPARATUS FOR MOTOR VEHICLES

(75) Inventor: Herbert Meyer, Regensburg (DE)

(73) Assignee: Audi AG, Ingolstadt (DE)

( * ) Notice: Subject to any disclaimer, the term of this patent is extended or adjusted under 35 U.S.C. 154(b) by 415 days.

(21) Appl. No.: 12/400,957

(22) Filed: Mar. 10, 2009

(65) Prior Publication Data

US 2009/0229946 A1    Sep. 17, 2009

(30) Foreign Application Priority Data

Mar. 12, 2008 (DE) .......................... 10 2008 013 911

(51) Int. Cl.
*F16D 23/14* (2006.01)
*F16F 15/121* (2006.01)
(52) U.S. Cl. ................................... 192/55.61
(58) Field of Classification Search ............... 192/55.61, 192/110 R; 464/66.1, 68.1, 68.5, 68.6, 68.8
See application file for complete search history.

(56) References Cited

U.S. PATENT DOCUMENTS

| 1,579,359 | A | * | 4/1926 | Hallenbeck | 192/110 R |
| 3,299,735 | A | * | 1/1967 | Stott | 192/110 R |
| 5,042,632 | A | * | 8/1991 | Jackel | 192/55.61 |
| 6,699,132 | B2 | * | 3/2004 | Friedmann et al. | 464/68.8 |
| 2002/0060118 | A1 | * | 5/2002 | Beneton et al. | 192/55.61 |
| 2003/0024788 | A1 | * | 2/2003 | Damm et al. | 192/55.61 |
| 2005/0279604 | A1 | * | 12/2005 | Vetter et al. | 192/55.61 |
| 2006/0289263 | A1 | * | 12/2006 | Friedmann et al. | 192/55.61 |

FOREIGN PATENT DOCUMENTS

| DE | 7245141 | | 3/1973 |
| DE | 315078 | A1 | 7/1983 |
| DE | 3447926 | A1 | 11/1985 |
| DE | 102004006691 | * | 9/2005 |
| DE | 102004006691 | A1 | 9/2005 |

OTHER PUBLICATIONS

"Bearing." Engineering.com. Jul. 12, 2007, [online], [retrieved on Jun. 15, 2011]. Retrieved from the internet. <URL: http://web.archive.org/web/20070712202049/http://www.engineering.com/Library/ArticlesPage/tabid/85/articleType/ArticleView/articleId/130/Bearings.aspx>.*
"Spacers and Standoffs." Pulley Manufacturers Inc. Dec. 22, 1997, [online], [retrieved on Jun. 15, 2011]. Retrieved from the internet. <URL: http://web.archive.org/web/19971222101623/http://pulleys.com/ss.htm>.*

\* cited by examiner

*Primary Examiner* — Gregory Binda
*Assistant Examiner* — Josh Skroupa
(74) *Attorney, Agent, or Firm* — Novak Druce + Quigg LLP

(57) ABSTRACT

A drive assembly for a motor vehicle including a flywheel secured to an engine output shaft, a clutch disk mounted on a transmission input shaft, a torsional vibration dampener functionally interposed between such flywheel and clutch disk and an adjustment disk disposed between the engine output shaft and clutch disk, in which a bushing mounted on the engine output shaft and the adjustment disk are provided with rotationally symmetrical, spherical contact surfaces.

9 Claims, 2 Drawing Sheets

DRIVE APPARATUS FOR MOTOR VEHICLES

The invention relates to a drive apparatus for motor vehicles.

BACKGROUND OF THE INVENTION

Drive apparatus such as these, especially with a dual-mass flywheel as a torsional vibration damper and a downstream separating clutch or a single-disk dry friction clutch are well known and are used in series in motor vehicles. When unfavorable tolerances in the output device coincide, misalignments, which can disrupt clutch function, can occur.

For example, clutch release mechanisms are known with self-centering release bearings (compare, e.g., DE 7245141 U1) whose stop ring is made spherical in order to relieve the release bearings of disturbing forces and moments. But the wobble motions which can occur on the separating clutch thus cannot be eliminated.

The object of the invention is to propose a drive apparatus of the generic type which, for the specified structure with a torsional vibration damper, with structurally simple means counteracts the disturbances which can occur due to misalignments.

SUMMARY OF THE INVENTION

It is proposed according to the invention that radially extending contact surfaces between the power output shaft (crankshaft) of the internal combustion engine and the hub section of the housing of the separating clutch or the secondary mass of the torsional vibration damper are made directly or indirectly spherical. The proposal is based on the finding that when misalignments may be present and when there is a (minor) wobble motion of the end of the power output shaft and/or of the separating clutch which is caused thereby, such wobble motion can be eliminated when the axial force applied by the clutch release bearings is supported by way of the spherical contact surfaces. In this connection, the entire secondary mass is additionally centered with the separating clutch at extremely low production engineering cost and problems such as possible clutch shutter or vibration phenomena are largely eliminated.

In a manner which favors production engineering, a guide bush or bearing flange can be attached to the power output shaft, on which bush or flange then there are radial contact surfaces between the guide bush and the hub section. The guide bush can be screwed integrated with the flywheel to the power output shaft.

A primary-side section of the flywheel can be pivoted on the aforementioned guide bush. The primary-side section of the flywheel can be composed here of a carrier plate which is screwed to the crankshaft, an intermediate flange attached to the plate and a primary part of the torsional vibration damper. With the spherical contact surfaces according to the invention installation-induced tilting or tilting due to operating loads between the end of the crankshaft and the bearing flange attached to it and the hub section of the separating clutch can be equalized.

Furthermore, it is proposed that there be an adjustment disk between the power output shaft or the guide bush and the hub section and that the adjustment disk on one side is made with spherical contact surfaces. In addition to the simplification of production engineering, moreover, tolerances in the axial direction can be equalized. Preferably the adjustment disk with spherical contact surfaces can adjoin the spherical contact surfaces of the guide bush.

The force which induces the adjustment disk to equalization displacement results from the force which is necessary for actuating the clutch. The adjustment disk there can equalize possible wobble motion or a vertical misalignment of the end of the crankshaft or of the guide bush by radial motion on the spherical contact surface.

In another version of the invention the adjustment disk can be located within the cover ring of a needle bearing that is positioned between the guide bush and the radially outer spacer sleeve of the primary mass of the torsional vibration damper. Thus the adjustment disk with the needle bearing forms a mounting unit which can be reliably slipped onto the guide bush.

The radii of curvature of the spherical contact surfaces are preferably matched to misalignments in installation and/or to periodically occurring misalignments which are caused by bending moments on the power output shaft (for reciprocating internal combustion engines by ignition pressures of individual cylinders) and thus equalize wobble motions of the components which form the secondary mass of the torsional vibration damper.

The torsional vibration damper can be conventionally made as a dual-mass flywheel, with a primary mass which is nonrotatably connected to the power output shaft of the internal combustion engine by way of carrier plates, with a secondary mass coupled to the housing of the separating clutch, and with damping springs connected in between.

Furthermore, the hub section of the housing of the separating clutch can be pivoted on the input shaft of the transmission and the input shaft of the transmission can be pivoted in the guide bush by way of needle bearings in order to produce equalization of misalignments using the axial force on the spherical contact surfaces which occurs particularly in release processes.

BRIEF DESCRIPTION OF THE DRAWINGS

FIG. 1 shows a drive apparatus 10 for motor vehicles which, however, is described only to the extent necessary for understanding of this invention. Components which have not been described in detail for the torsional vibration damper and the separating clutch are implemented in a design that is familiar to one skilled in the art.

DETAILED DESCRIPTION OF PREFERRED EMBODIMENT OF THE INVENTION

Figure 1:
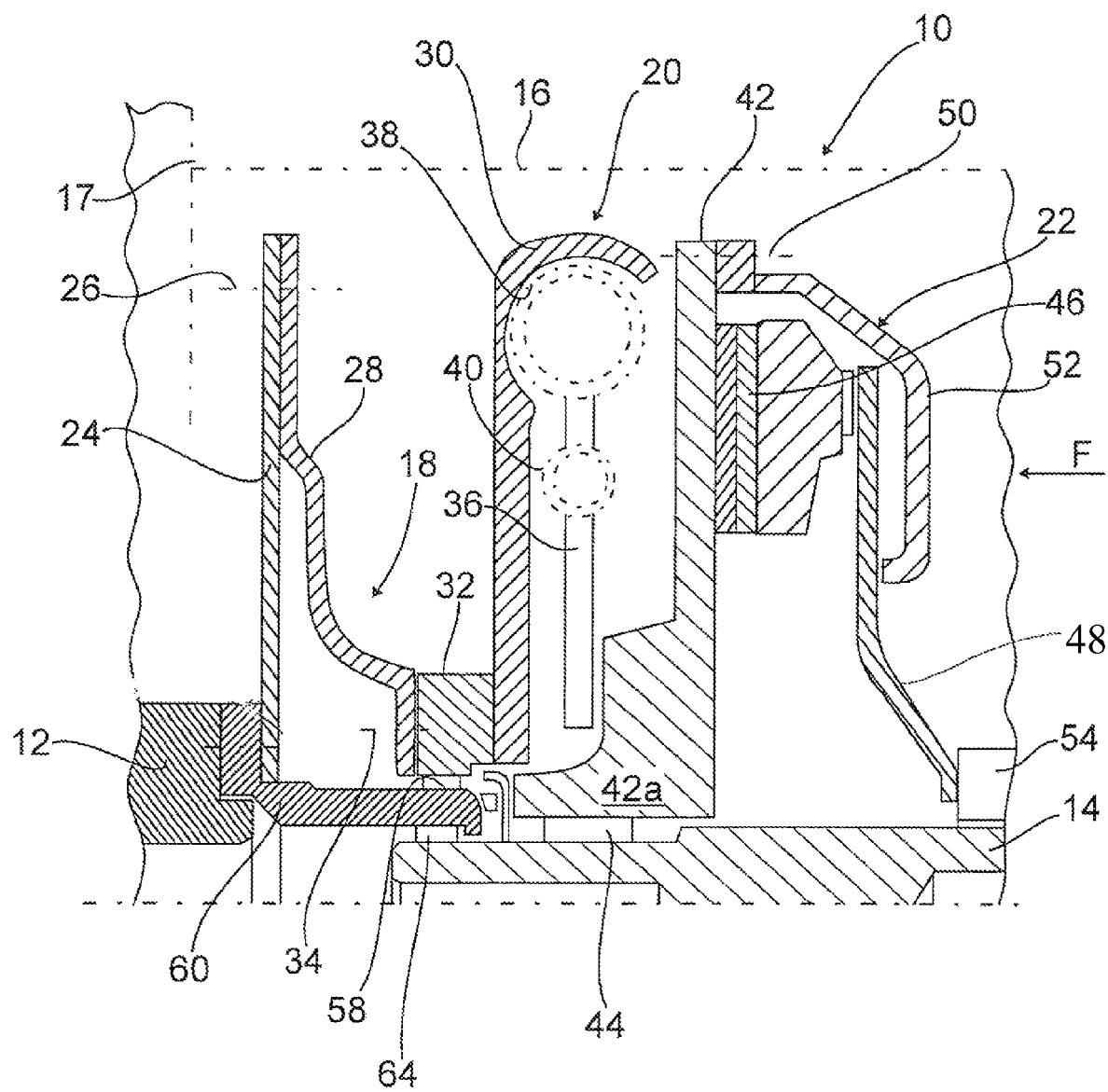
FIG. 1 shows a partial longitudinal section of a drive apparatus with a flywheel located between the power output shaft of an internal combustion engine and a downstream change-speed gearbox with an integrated torsional vibration damper, a separating clutch and an adjustment disk with spherical contact surfaces.

As shown in FIG. 1, between the power output shaft or crankshaft 12 of the internal combustion engine (not further shown) and the input shaft 14 of a change-speed gearbox (e.g., a manual transmission) within a clutch housing 16 there is a flywheel 18 with an integrated torsional vibration damper 20 and a downstream separating clutch 22. The clutch housing 16 is flanged in the conventional manner to the crankcase 17 of the internal combustion engine (only suggested).

The indicated components 18, 20, 22 form the flywheel mass which is propulsively joined to the crankshaft 12 and which is divided into a primary mass and a secondary mass on the torsional vibration damper 20 which is made as a dual-mass flywheel.

The primary-side section of the flywheel 18 is composed of a disk-shaped carrier plate 24 which is screwed to the crankshaft 12, an intermediate flange 28 which is attached to the carrier plate 24 by means of screws 26, and a flange-shaped primary part 30 of the torsional vibration damper 20. The intermediate flange 28 and the primary part 30 are attached to one another by way of screws 34 with the interposition of a spacer sleeve 32.

The secondary-side section of the flywheel 18 has a flange-shaped secondary part 36 which is conventionally coupled to the primary part 30 by way of peripherally distributed damping springs 38 and 40 and which is propulsively connected to a base plate 42 of the separating clutch 22.

The base plate 42 is pivoted by way of a hub section 42*a* on the input shaft 14 of the transmission by way of a radially guiding needle bearing 44. Furthermore, the secondary-side flywheel mass includes the driver disk 46 which is positively connected to the input shaft 14 in the direction of rotation, and the pressure plate 48 of the separating clutch 22, as well as its housing 52 which is connected to the base plate 42 by way of screws 50.

The separating clutch 22 can be released by means of a release bearing 54 (only partially visible) and a hydraulic actuating device against the pretensioning force of a disk spring of the separating clutch 22, the release bearing 54 applying a force in the direction of the arrow F.

Furthermore, the spacer sleeve 32 with the primary part 30 is pivoted by way of another needle bearing 58 on a guide bush 60, the guide bush 60, as is apparent from FIG. 1, being securely connected to the crankshaft 12 by way of screws together with the carrier plate 24. Within the guide bush 60 there is a needle bearing 64 in which the input shaft 14 of the transmission is pivoted.

The indicated needle bearings (or roller bearing) 44, 58, 64 form radial bearings which act as follows:

In the released state of the separating clutch 22 (e.g., in the process of the vehicle starting out and with the clutch pedal depressed) the crankshaft 12 turns with the flywheel 18, the torsional vibration damper 20 and the separating clutch 22, while the driver disk 46 and the input shaft 14 are stationary. Relative rpm are present in the needle bearings 44, 58 and 64.

In the engaged state of the separating clutch 22 and, optionally, when power is being transferred, there are almost no relative rpm, but rotational irregularities of the internal combustion engine are damped conventionally in the torsional vibration damper 20, small differences of the rotational angle likewise being accommodated by way of the needle bearings 44, 58, 64.

Figure 2:
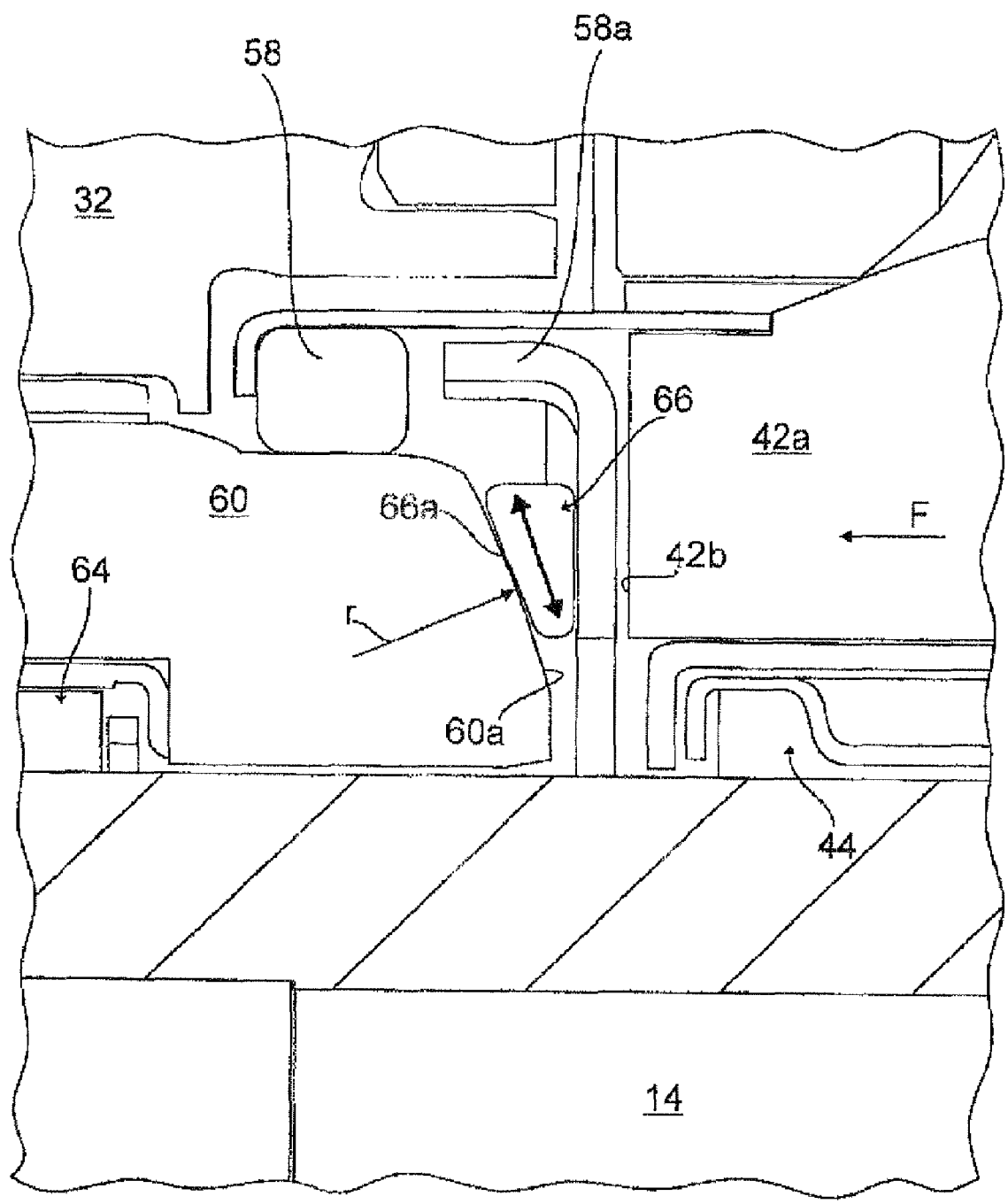
FIG. 2 shows detail Z as shown in FIG. 1 in the region of the spherical contact surfaces between the guide bush and the adjustment disk, and with the bordering hub section.

To support the axial force F of the turning components on the guide bush 60, which force occurs especially in a release process on the separating clutch 22 (compare FIG. 2), the bush on its free end face has a rotationally symmetrical, spherical contact surface 60*a* which is adjoined by the likewise rotationally symmetrical contact surface 60*a* of the adjustment disk 66.

The adjustment disk 66 of defined thickness is positioned within a cover disk 58*a* of the needle bearing 58 and interacts by way of this cover disk 58*a* with a radial stop surface 42*b* of the hub section of the base part 42.

The axial force F is thus supported on the guide bush 60 which is securely connected to the crankshaft 12 by way of the base part 42 of the separating clutch 22, by way of the cover disk 58*a* and the adjustment disk 66.

Accordingly, equalization of the misalignments which may occur due to unfavorable accumulation of tolerances can be accomplished by way of the adjoining spherical contact surfaces 60*a*, 66*a*; these misalignments could lead to wobble motion in the torsional vibration damper 22 and in the separating clutch 22. Disruptions and distortions in the drive apparatus 10 at the very least can be reduced with structurally minimum effort.

The radii of curvature r of the spherical contact surfaces 60*a*, 66*a* are matched to misalignments in installation and/or to periodically occurring misalignments which are caused by bending moments on the crankshaft 12. The contact surfaces 60*a*, 66*a* can be furthermore designed geometrically and specifically to the material such that undue material stresses or pressures do not occur.

The invention is not limited to the illustrated embodiment. Optionally the indicated spherical contact surfaces 60*a*, 66*a* can also be provided directly between the crankshaft 12 (with corresponding axial lengthening) and the hub section 42*a*; the same applies in the use of the guide bush 60 which could likewise interact accordingly with the hub section 42*a*.

The invention claimed is:

1. A drive assembly for a motor vehicle having an engine output shaft and an axially aligned transmission input shaft, comprising:
    a bushing mounted on said output shaft;
    a flywheel rigidly secured to said output shaft;
    a clutch disk rotatably mounted on said input shaft;
    a torsional vibration damper functionally interposed between said flywheel and said clutch disk; and
    an adjustment disk disposed between said bushing mounted on said output shaft and said clutch disk, interacting with said clutch disk,
    wherein said bushing mounted on said output shaft and said adjustment disk are provided with rotationally symmetrical, spherical contact surfaces.

2. The drive assembly according to claim 1 wherein said bushing mounted on said output shaft is provided with a cylindrical guide portion rotatably supported on said input shaft, said clutch disk is provided with a hub portion rotatably supported on said input shaft, said adjustment disk is disposed between said guide portion and said hub portion and said rotationally symmetrical, spherical contact surfaces are provided on said guide portion and said adjustment disk.

3. The drive assembly according to claim 2 wherein a portion of said flywheel is rotatably mounted on said guide portion.

4. The drive assembly according to claim 3 wherein said adjustment disk is disposed within an annular cover member of a bearing disposed between said guide portion of said output shaft and a spacer portion of said flywheel.

5. The drive assembly of claim 1 wherein the radii of curvature of the contact surfaces are configured to compensate for misalignments between said shafts.

6. The drive assembly according to claim 1 wherein said torsional vibration dampener and said clutch disk are rotatably mounted on said input shaft.

7. The drive assembly according to claim 1 wherein said torsional vibration dampener is provided with a primary mass secured to said output shaft and a secondary mass secured to said clutch disk with dampening springs secured therebetween.

8. The drive assembly according to claim 1 wherein said input shaft is received in an axially disposed opening in a bushing mounted on said output shaft and is journalled in a bearing disposed therebetween.

9. The drive assembly according to claim 1 including a cover disk of a bearing, disposed between said adjustment disk and said clutch disk through which said adjustment disk interacts with said clutch disk.

* * * * *